(12) United States Patent
Reckhart

(10) Patent No.: US 7,395,740 B2
(45) Date of Patent: *Jul. 8, 2008

(54) FISH TAPE AND PLIERS CONSTRUCTION

(75) Inventor: Harry Reckhart, Stoneboro, PA (US)

(73) Assignee: Channellock, Inc., Meadville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/685,453

(22) Filed: Mar. 13, 2007

(65) Prior Publication Data

US 2007/0169594 A1    Jul. 26, 2007

Related U.S. Application Data

(63) Continuation of application No. 11/336,682, filed on Jan. 20, 2006.

(51) Int. Cl.
*B25B 7/02* (2006.01)

(52) U.S. Cl. ............ 81/418; 7/107; 7/129; 254/134.3 R

(58) Field of Classification Search .................. 81/415, 81/416, 418; 7/106, 107, 125, 127, 129, 7/130, 132, 133; 254/134.3

See application file for complete search history.

(56) References Cited

U.S. PATENT DOCUMENTS

| | | | | |
|---|---|---|---|---|
| 1,518,251 A | * | 12/1924 | Carlson | 81/416 |
| 2,598,146 A | * | 5/1952 | Tays | 81/418 |
| 3,005,366 A | * | 10/1961 | Grimshaw et al. | 81/416 |

\* cited by examiner

*Primary Examiner*—D. S Meislin
(74) *Attorney, Agent, or Firm*—Lackenbach Siegel, LLP

(57) ABSTRACT

A fish tape pliers is formed with opposed planar and curvilinear edges that form or channel disposed distally from the pliers' pivot connection axis. In one operable embodiment, the edges frictionally engage the fish tape within the channel. The fish tape in pulling an electrical wire through a conduit, is directed away from the handles and the users' grip hand. The jaws may have differently contoured or cross-ridged surfaces to provide the desired frictional engagement without damaging the fish tape. The fish tape pliers includes diverse complementary features for crimping, stripping, bending and/or cutting an electrical wire.

10 Claims, 9 Drawing Sheets

US 7,395,740 B2

FISH TAPE AND PLIERS CONSTRUCTION

PRIOR RELATED APPLICATIONS

This application is a continuation of application Ser. No. 11/336,682, filed Jan. 20, 2006, and incorporates the prior application herein in its entirety and claims priority thereto.

BACKGROUND

1. Field of the Invention

This invention relates to pliers. This invention also relates to tape pullers. Specifically, this invention relates to pliers for pulling a fish tape for pulling electrical wires through conduits. This invention also relates to a multi-tool for fish tape pulling and, electrical wire reconfigurations.

2. Background and Discussion of the Prior Art

Tape pullers generally provide for grabbing the end of the tape by closed pliers jaws. The tape passes medially between the closed gripped handles. This prior art construction causes the tape to undesirably rub the user's grip hand. Such prior art tape pulling pliers are disclosed in Grimshaw et al, U.S. Pat. No. 3,005,366, granted Oct. 21, 1961 and Higgins, U.S. Pat. No. 2,542,249, granted Feb. 20, 1951.

Attempts are made to direct the tape away from the grip hand of the user. One early attempt at redirecting the tape away from the grip hand is disclosed in Tays, U.S. Pat. No. 2,598,146, granted May. 27, 1952 ("Tays"). The Tays construction nonetheless caused the angularly disposed tape to be disposed immediately adjacent one of the handles thereby causing undesired contact with the user's grip hand. A more recent attempt at redirecting the tape is disclosed in the accompanying FIGS. 1-3.

Referring specifically to FIGS. 1-3, there is shown the prior art fish tape pliers 10. Pliers 10 includes two members 11 and 12 pivotally connected by pivot member 13. Members 11 and 12 are formed with respective proximately disposed opposed handles 14 and 15 and respective distally disposed opposed jaws 16 and 17. Curvilinear surface or edge 18 of jaw 16 and surface or edge 19 of handle 15 are facingly disposed and form channel 20. Fish tape T passes through channel 20 and engages the distal portion 18a of edge 18 and the proximate portion 19a of edge 19, with the pliers at least partially closed (FIG. 3).

Additional respective portions of surfaces 18 and 19 engage the fish tape T with the further closure of the pliers. Channel 20 is proximately disposed from pivot member 13. With fish tape T frictionally held between edges 18 and 19, the user pulls the fish tape through conduit 25. The fish tape T undesirably engages or rubs against the users' grip hand in pulling the fish tape (FIG. 1). Surfaces 18 and 19 crimp or distort the fish tape thereby undesirably affecting the smooth spooling and unspooling of the fish tape in subsequent use.

SUMMARY OF THE INVENTION

A pliers is formed with opposed jaws having a channel with opposed surfaces for frictionally engaging and specifically directing a thin flexible element, such as a tape. The frictionally engaged tape is angularly disposed in a specifically configured channel. The channel is distally disposed from the pliers pivot axis. The tape is consequently directed or channeled away from the handles and the users' grip hand.

In one embodiment, the invention is a fish tape pliers with one jaw formed with an angularly disposed planar edge with the other jaw formed with an opposed curvilinear edge. The opposed edges form a channel. The channel is distally disposed from the pliers pivot axis. The closed jaws frictionally engage the fish tape. The opposed edges, in one operable embodiment are spacedly disposed from the fish tape, and in another embodiment, frictionally engage the fish tape. The fish tape is disposed in the distally disposed channel. Consequentially, the fish tape is directed away from the handles and the users' grip hand.

The pliers jaws are formed with opposed surfaces for frictionally engaging the fish tape adjacent the distal end of the pliers. The opposed jaws, in preferred embodiments, are formed with diverse combinations of cross-ridged and smooth planar surfaces. These diverse combinations of surfaces provide in turn diverse gripping modes wherein the fish tape is securely held without undesired distortion or crimping. These further preferred constructions permit the desired degree of holding of the fish tape for pulling the fish tape through a conduit without damaging the fish tape. This in turn permits the fish tape to be readily repeatedly spooled and unspooled in subsequent use.

The present invention, in the various embodiments, includes complimentary components for wire stripping, crimping cutting and/or bending. The pliers in other words is a multi-tool for pulling tape and variously reconfiguring an electrical wire.

DESCRIPTION OF THE INVENTION

Figure 1:
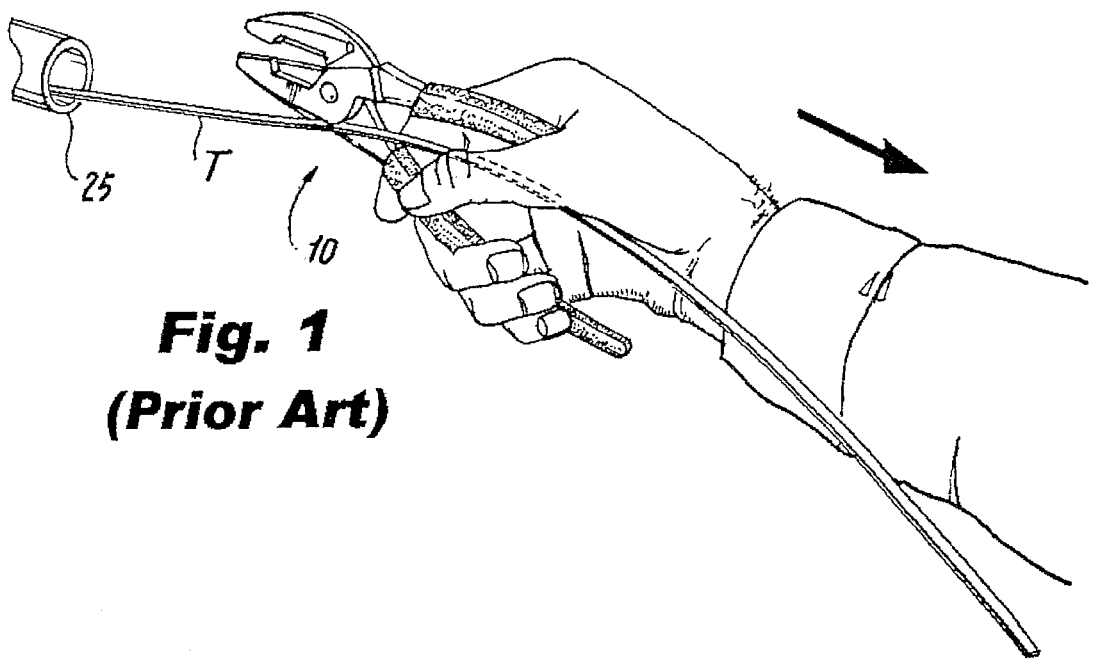
FIG. 1 is a perspective view of a prior art fish tape pliers in use pulling a fish tape through a conduit.
Figure 2:
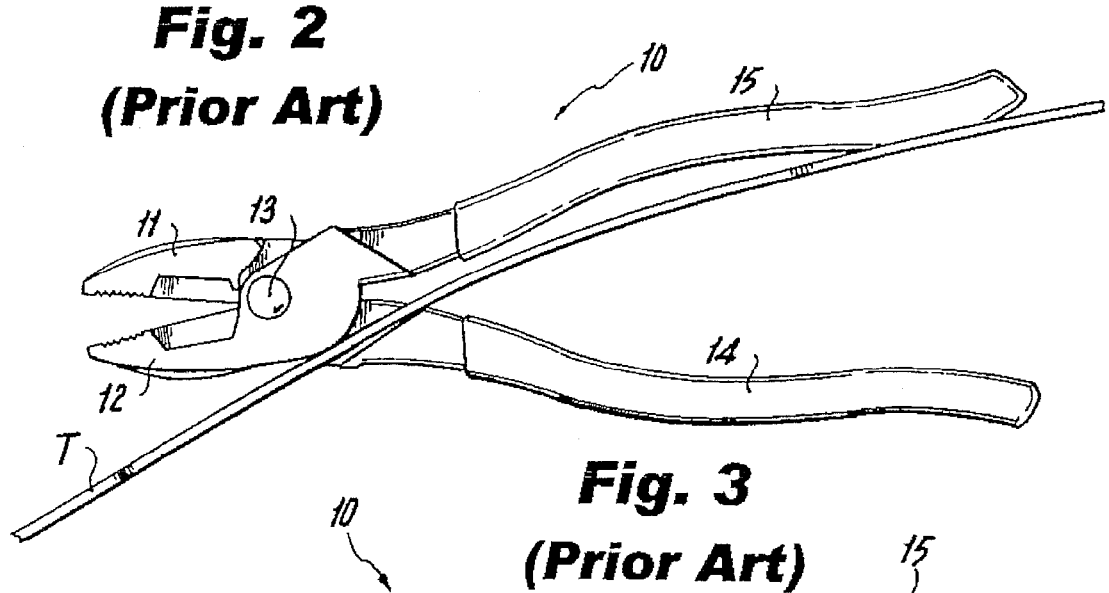
FIG. 2 is a side elevational view of the prior art fish tape pliers of FIG. 1 engaging the fish tape pliers.
Figure 3:
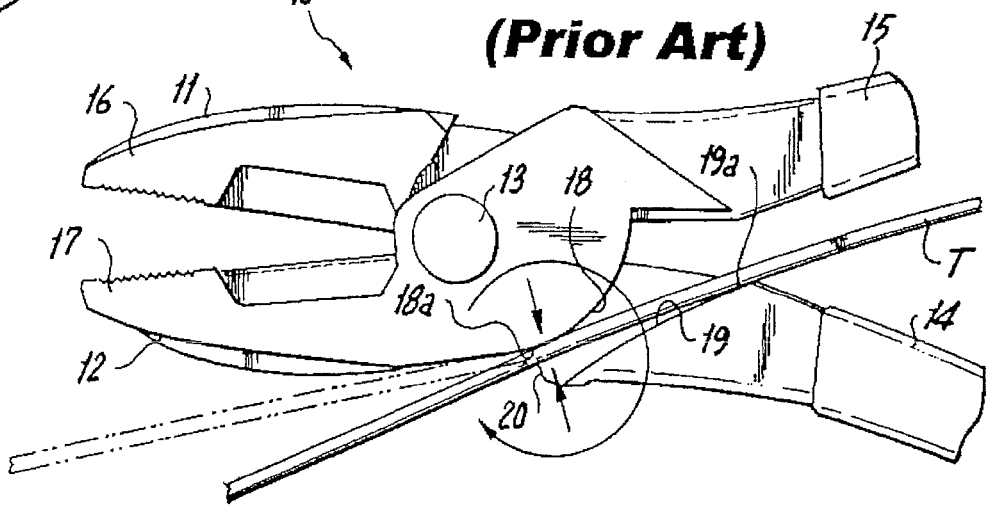
FIG. 3 is an enlarged fragmentary view of the distal end portion of the fish tape pliers of FIG. 1.
Figure 4:
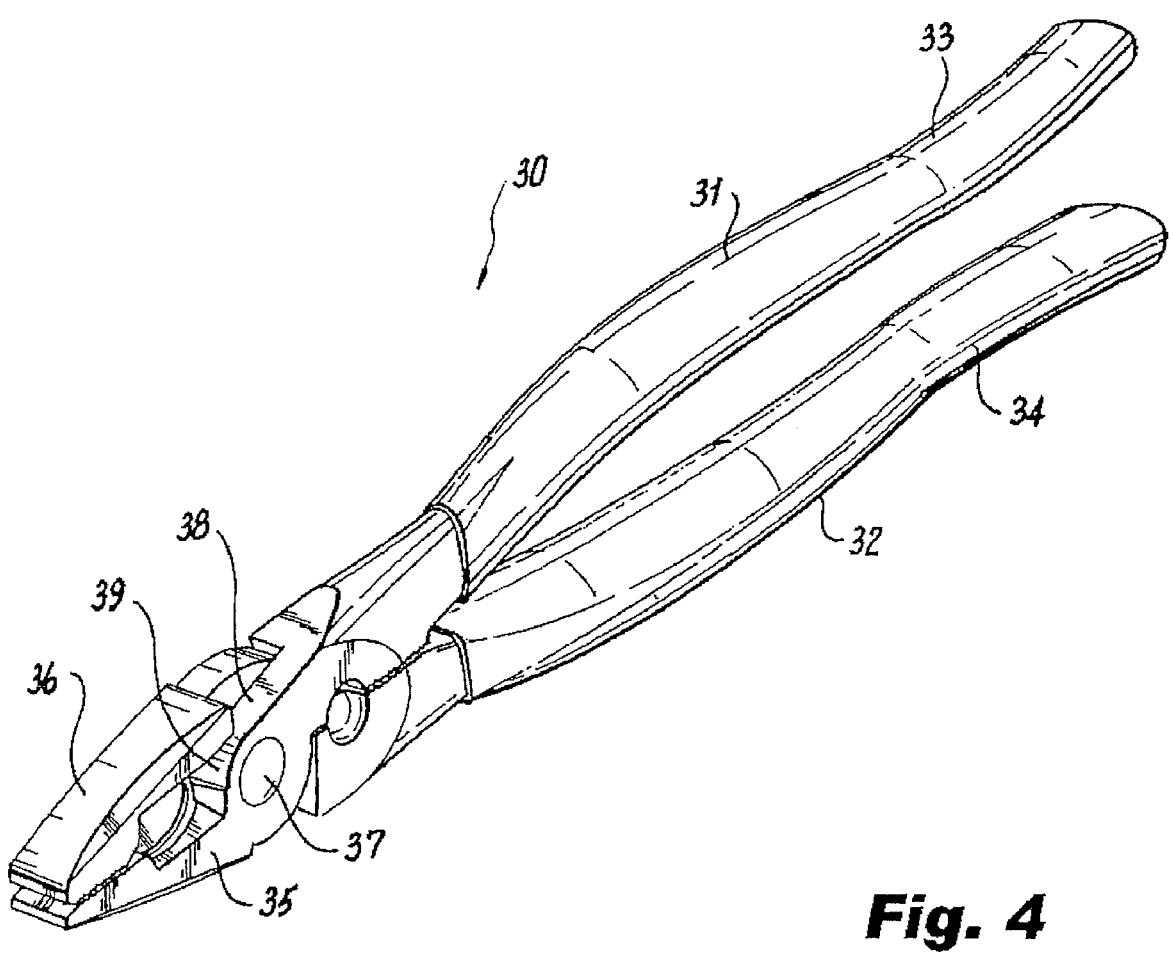
FIG. 4 is a distal end perspective view of one embodiment of the fish tape pliers of the present invention.
Figure 5:
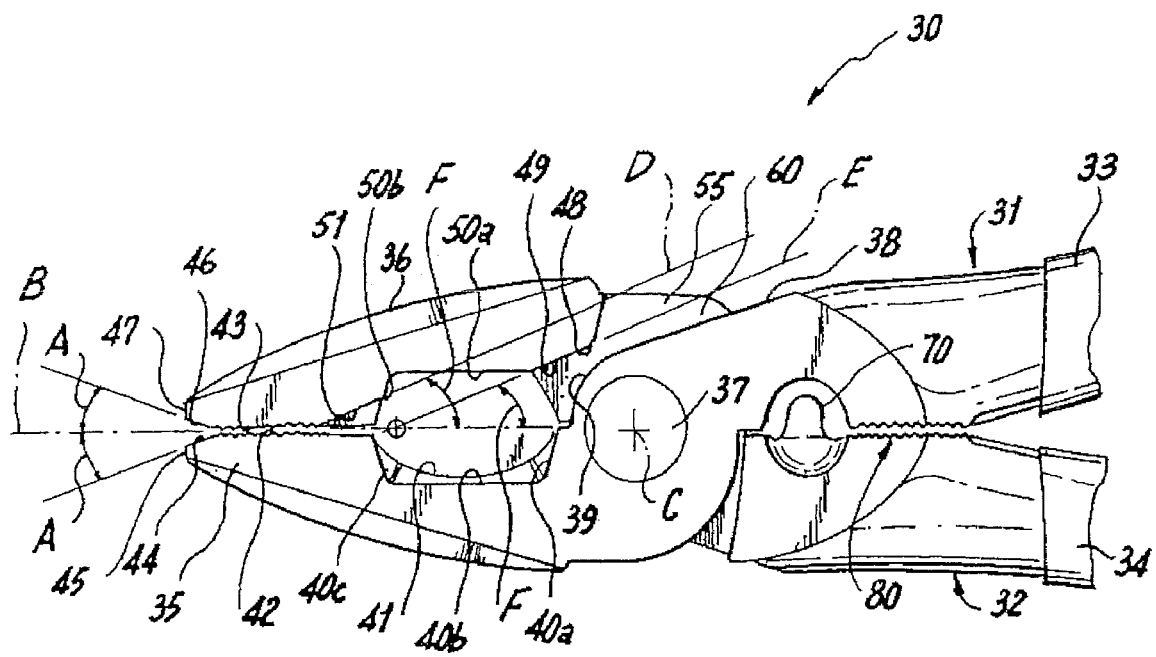
FIG. 5 is an enlarged fragmentary side elevational view of the fish tape pliers of FIG. 4.
Figure 6:
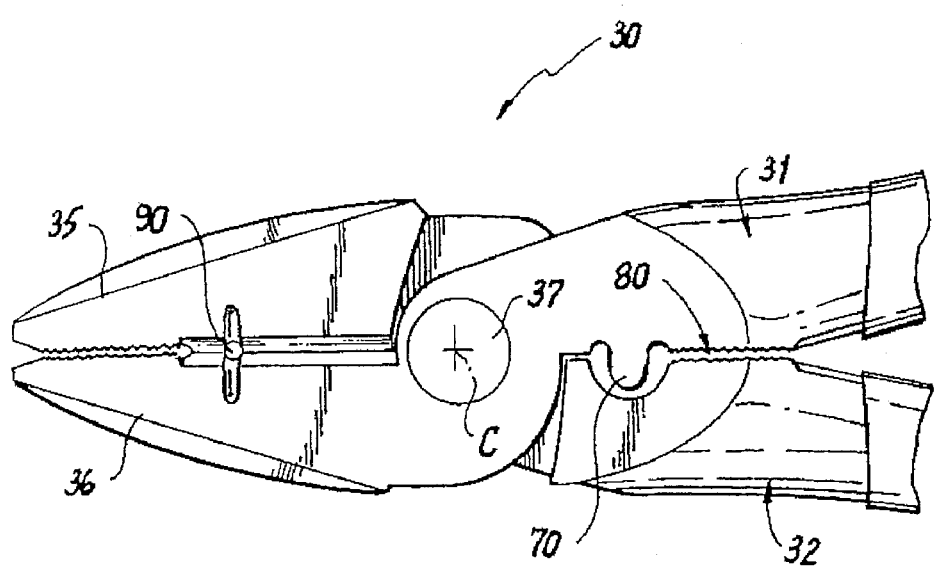
FIG. 6 is a reverse side elevational view of the fish tape pliers shown in FIG. 5.
Figure 7:
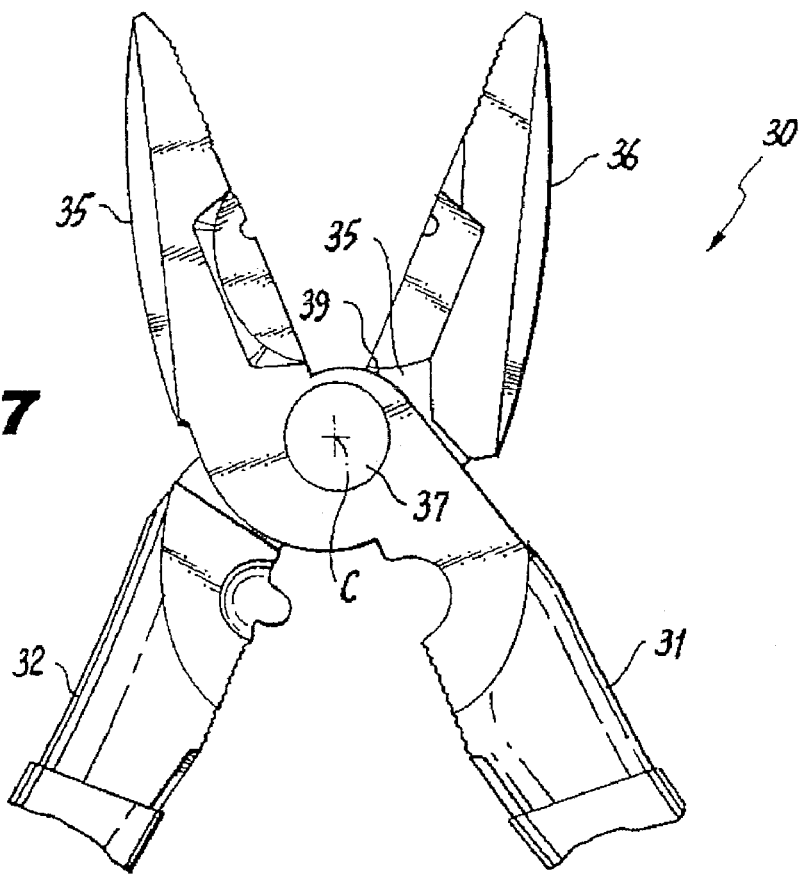
FIG. 7 is a further view of the pliers of FIG. 6 with the jaws in the open position.
Figure 8:
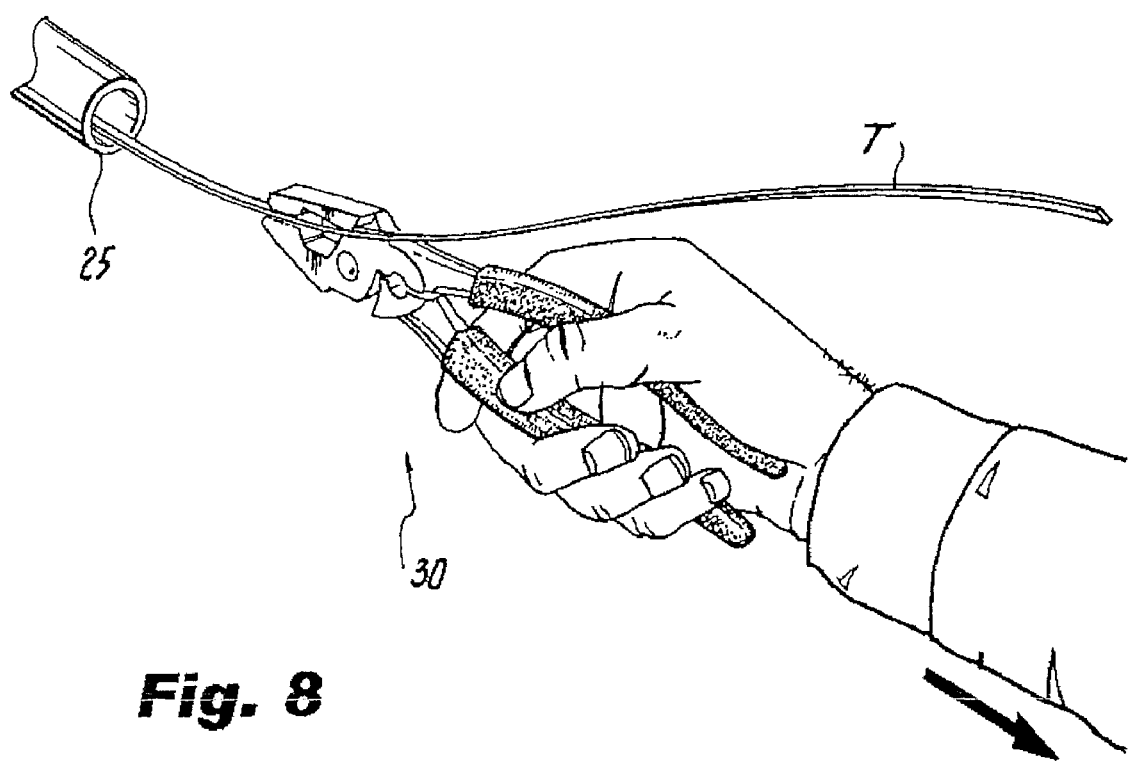
FIG. 8 is a perspective view of the proximate end of the pliers of FIG. 4 in use pulling a fish tape through a conduit.

FIGS. 4-20 show diverse embodiments of the present invention. Referring specifically to FIGS. 4-5, there is shown fish tape pliers 30. Pliers 30 includes members 31 and 32 having respective proximately disposed opposed handles 33 and 34, and respective distally disposed opposed jaws 35 and 36. Members 31 and 32 are pivotally connected at and by pivot member 37. Pivot member 37 has pivot axis C. Member 31 is formed with angularly disposed edge or wall 38, which extends distally to and is contiguous with rounded edge or wall 39. Wall 39 in turn is contiguous with recessed wall portions 40a, 40b and 40c. Wall portions 40a-40c forms thin curvilinear edge 41. Wall 39 and wall portions 40a-40c are specifically contoured for purposes hereinafter appearing.

The distal end of jaw 35 is formed with a cross-ridged surface 42, and the distal end of opposed jaw 36 is formed with a similar cross-ridged surface 43 for gripping frictionally engaging fish tape T. An angularly disposed wall or edge 44 is disposed between surface 42 and distal end 45. Jaw 36 likewise has a similar angularly disposed wall 46 disposed between distal end 47 and cross-ridged surface 43. Angularly disposed walls 44 and 46 subtend an angle A with pliers medial or center line or plane B. Center line or plane B extends medially through pivot axis C. Walls 44 and 46 receive fish tape T to permits the angular disposition of fish tape T, on closure of the jaws (FIGS. 9-11), as will be further explained hereinafter.

Jaw 36 is formed with edge or wall 48, and angularly disposed edge or wall 49, contiguous recessed wall portions 50a and 50b, and second angularly disposed wall or edge 51. First and second walls 49 and 51 are similarly angularly disposed as shown by parallel lines or planes D and E, which subtend equal angles F. Wall 51 is contiguous with cross-ridged surface 43. Jaw 36 is formed with a thin curvilinear edge, which conforms with opposed thin curvilinear edge 41, to provide an auxiliary wire cutting function.

Figure 9:
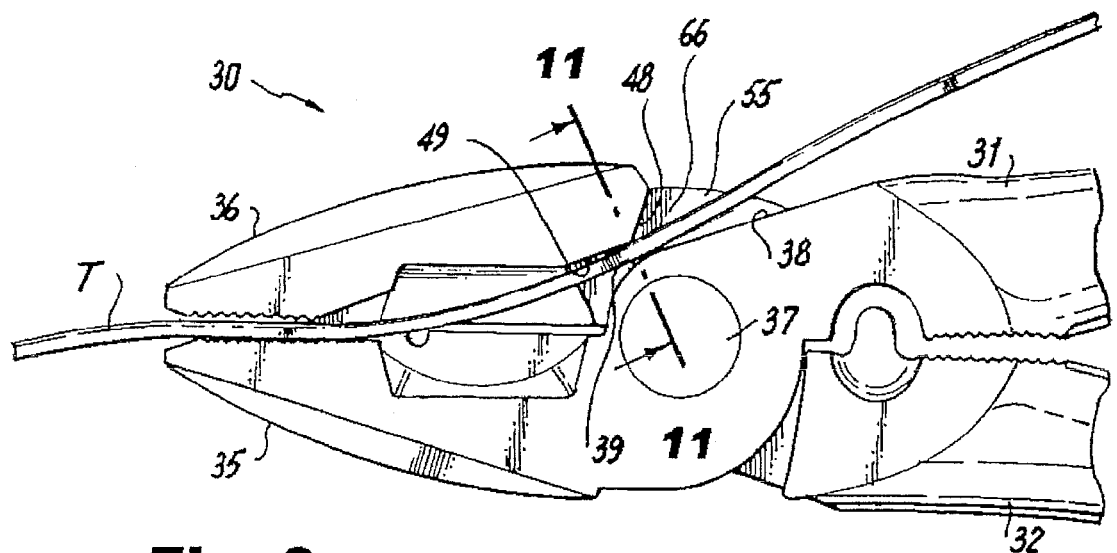
FIG. 9 is an enlarged side elevational fragmentary view of the distal end of the pliers of FIG. 4 in a first operable mode.
Figure 10:
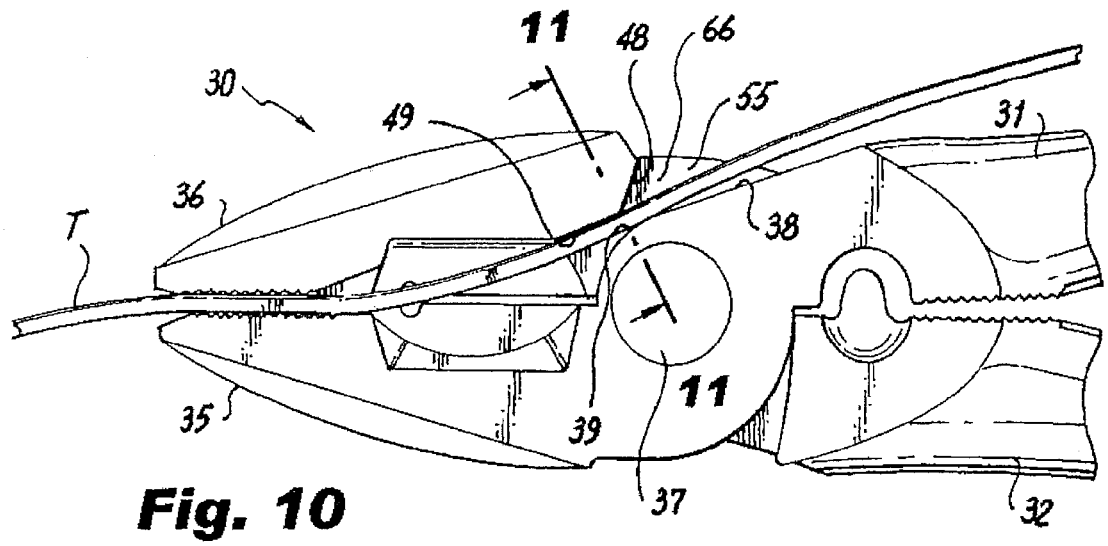
FIG. 10 is an enlarged side elevational fragmentary view of the distal end of the pliers of FIG. 4 in a second operable mode.
Figure 11:
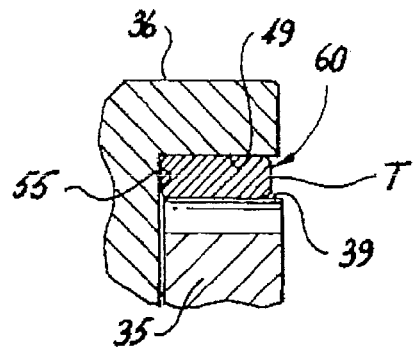
FIG. 11 is an enlarged fragmentary sectional view along line 11-11 of FIG. 10.

Edges 38 and 39 together with edge 49, and transverse wall 55 form channel 60. Fish tape T passes through channel 60. In a first operable mode, fish tape T is spacedly disposed from edges 39 and 49 (FIG. 9). In a second operable mode, fish tape T frictionally engaged by edges or walls 39 and 49 (FIG. 9). Walls 39 and 49 are distally disposed from pivot connection 37. In this manner of construction, fish tape T is specifically angularly disposed and channeled away from the handles, particularly handle 33, and away from the users' grip hand (FIGS. 9-10).

Figure 12:
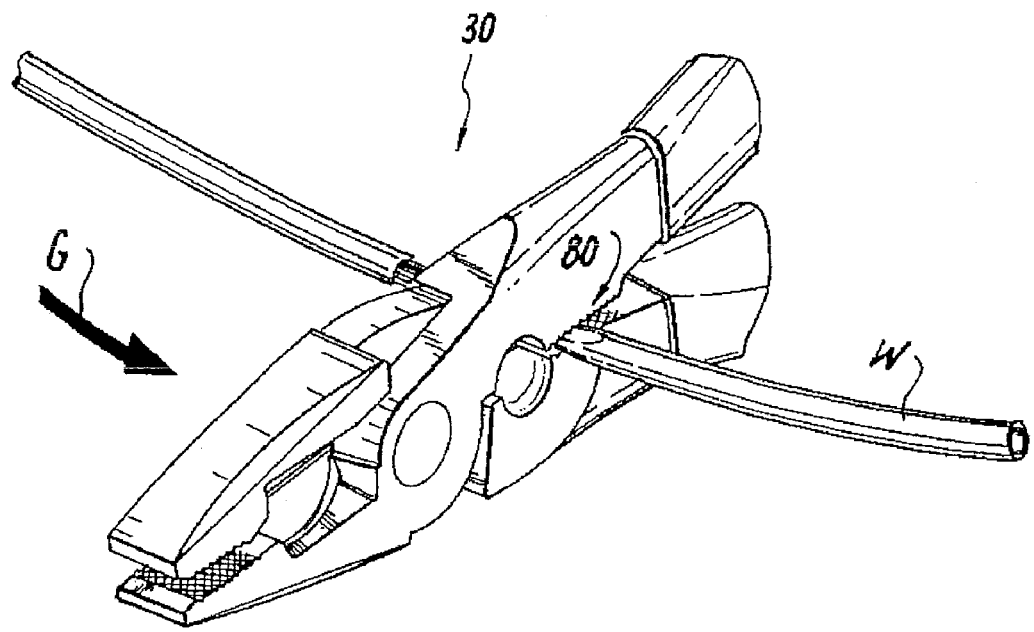
FIG. 12 is a distal end perspective view of the pliers of FIG. 4 in a wire crimping and stripping mode.

Referring specifically to FIG. 12, there is shown the use of pliers 30 for crimping and stripping electrical wire W. Respective opposed surfaces 70 and 80 may be used to bend and crimp a plurality of wires (not shown). The pliers 30 are moved in the direction of arrow G to crimp or strip wire W.

Figure 13:
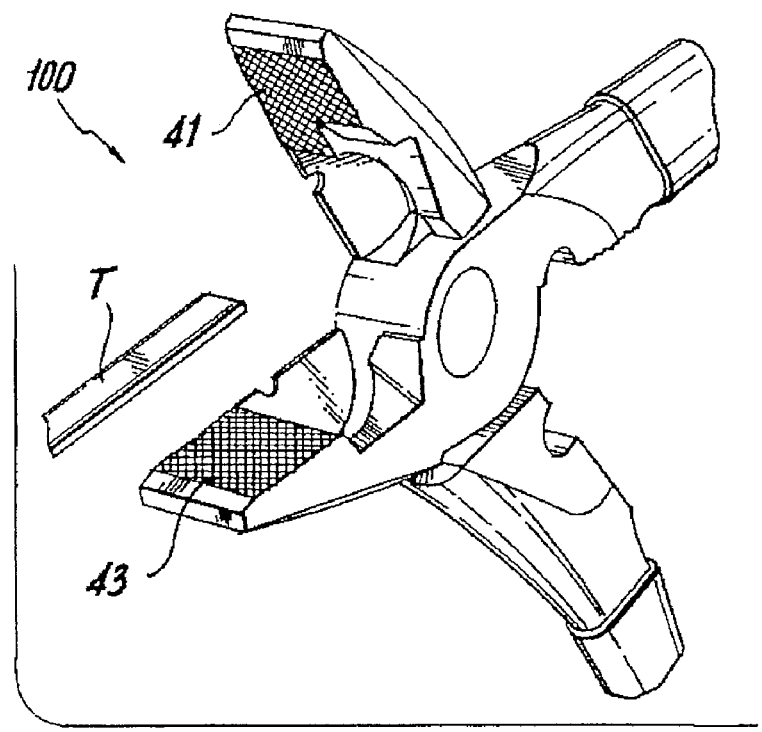
FIG. 13 is a distal end perspective view of the pliers of FIG. 4 with the jaws open for receiving the fish tape.
Figure 14:
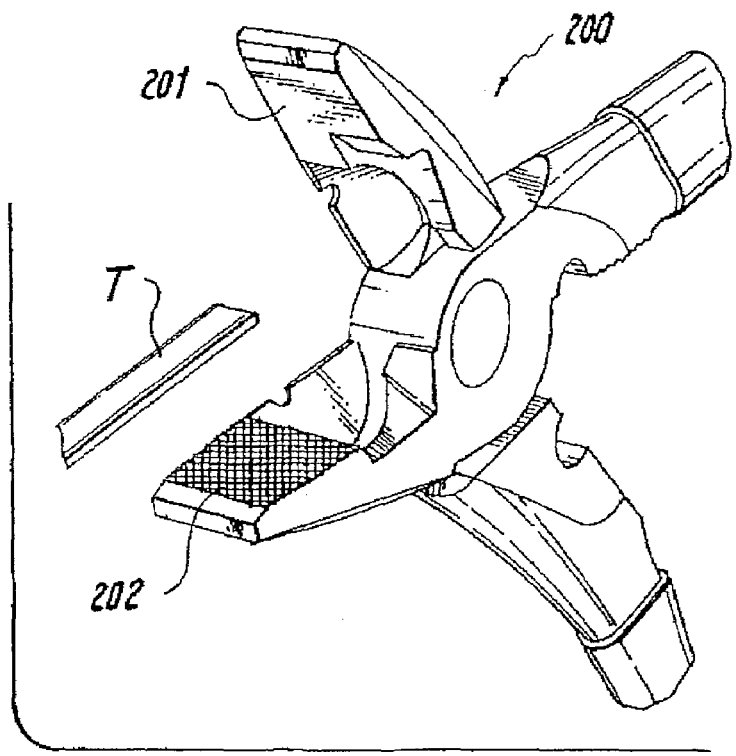
FIG. 14 is a distal end perspective fragmentary view of a further embodiment of the pliers showing modified jaw surfaces with the jaws open for receiving the fish tape.
Figure 15:
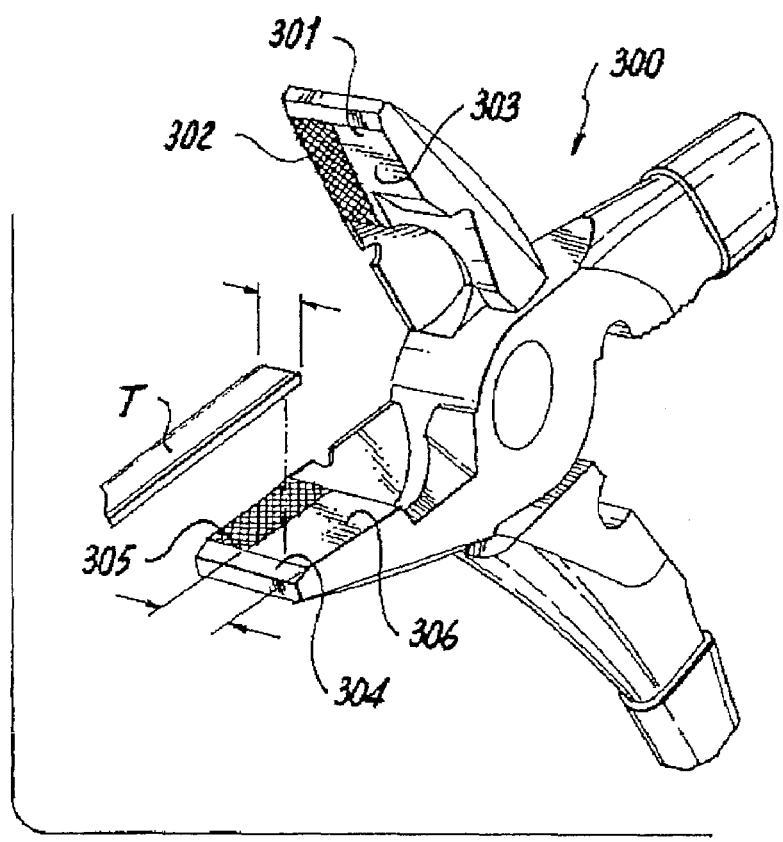
FIG. 15 is a view as shown in FIG. 14 showing, a still further embodiment having modified jaw surfaces with the jaws open for receiving the fish tape.

Referring specifically to FIGS. 13-17, there are shown several embodiments, respectively pliers 30, 200, 300, 400 and 500. Pliers 30, 200, 300, 400 and 500, respectively are shown with the jaws open and disposed to receive fish tape T. FIG. 13 shows the opposed fully cross-ridged jaw surfaces 41 and 43. FIG. 14 shows pliers 200 wherein one jaw surface 201 is smooth planar and the opposed jaw surface 202 is fully cross-ridged. FIG. 15 shows pliers 300 wherein one jaw surface 301 is in one part cross-ridged 302 and in the other part smooth planar 303, and the opposed jaw surface 304 is similarly configured, i.e. in one part cross-ridged 305 and in the other respective part smooth planar 306. Embodiments 200 and 300, permit the further options of either holding the fish tape with a high degree of frictional engagement, e.g. by both fully cross-ridged surfaces (FIG. 13) or to, depending upon the degree of resistant force presented by the tape-pulling job by a cross-ridged and opposed smooth surfaces (FIG. 14).

Figure 16:
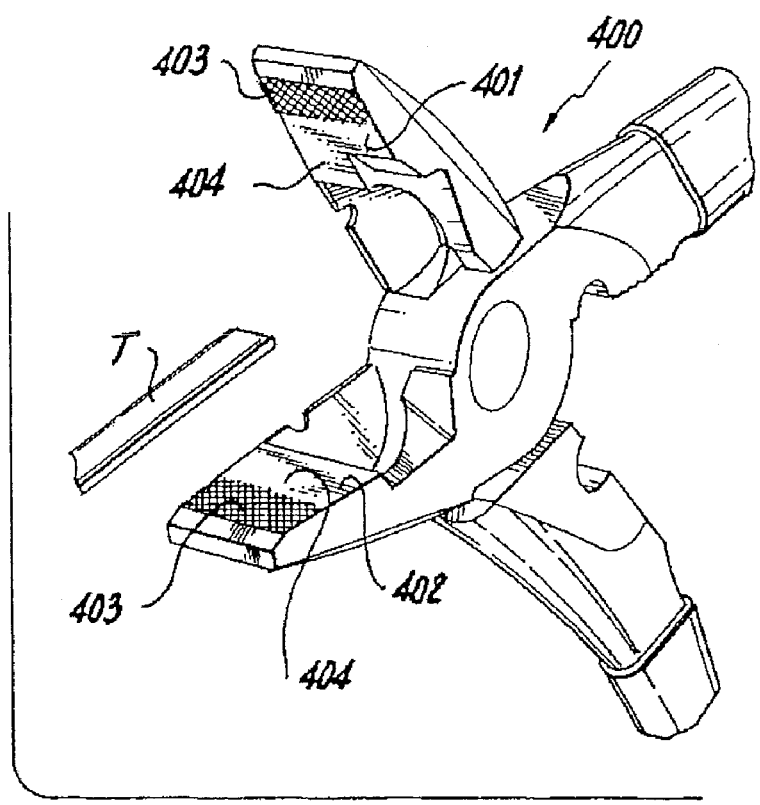
FIG. 16 is a view as shown in FIG. 14 showing, a still further embodiment having modified jaw surfaces with the jaws open for receiving the fish tape.
Figure 17:
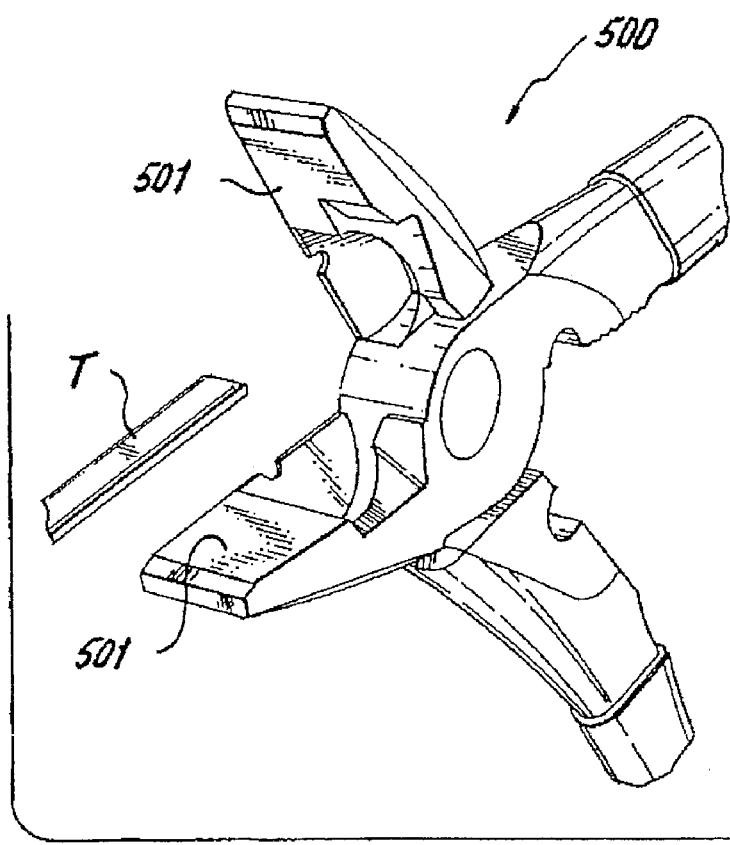
FIG. 17 is a view as show in FIG. 14 showing, a still further embodiment having modified jaw surfaces with the jaws open for receiving the fish tape.

FIG. 16 shows pliers 400 wherein each jaw surface 401 and 402 is in part cross-ridged 403 and in part smooth 404. FIG. 17 shows pliers 500 wherein each jaw surface 501 is a smooth planar surface. Embodiments 400 and 500 permit the further option of a relatively modest degree of frictional engagement.

Figure 18:
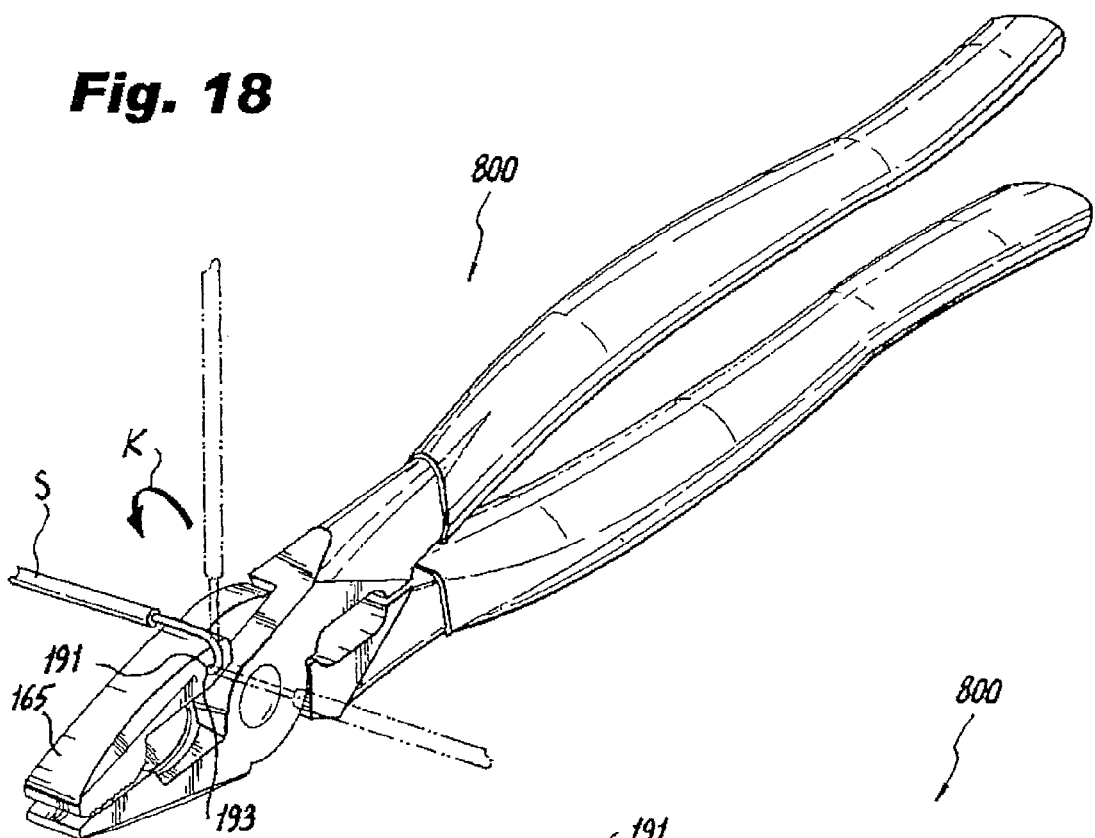
FIG. 18 is a perspective view of a still further embodiment of the fish tape pliers invention showing the inclusion of a wire bending construction.
Figure 19:
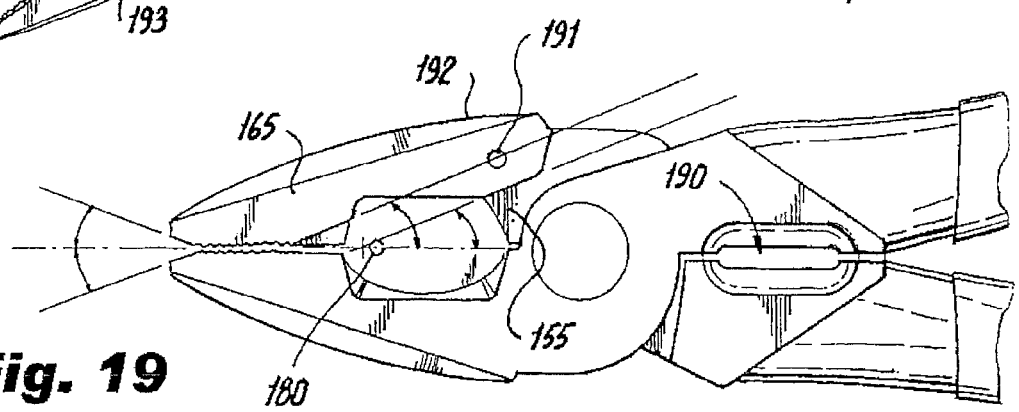
FIG. 19 is an enlarged fragmentary side elevational view of the distal end of the pliers of FIG. 18.
Figure 20:
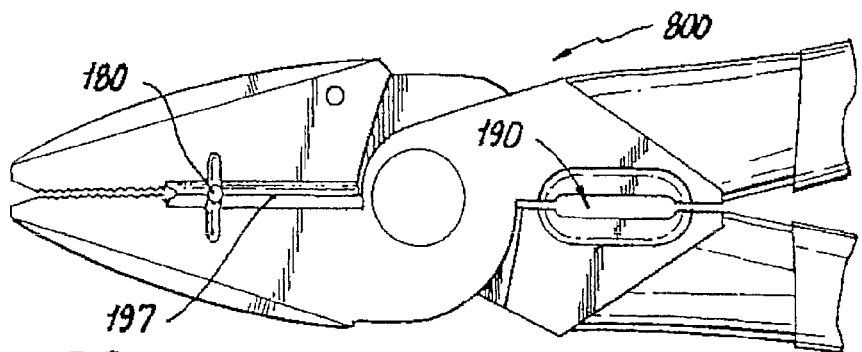
FIG. 20 is a reverse side elevational view of the pliers of FIG. 19.

Referring to FIGS. 18-20, there is shown a further embodiment of this present invention, fish tape pliers 800. Pliers 800 has similar features to that of embodiments of the prior FIGS., particularly including fish tape receiving channel 155, wire stripping construction 180, wire cutting construction 197, and wire crimping construction 190. Pliers 800, however further includes a wire bending construction. that includes a blind hole 191 in jaw 165. The end of stripped wire S is inserted into blind hole 191 and the wire is rotated through bending action K on surface 192 of jaw 165 to form U-bend 193 (FIG. 18). Hole 191 may extend to the other side 166 of jaw 165 for left and right hand bending functions (not shown). In this manner of construction, pliers 800 provides both fish tape pulling functions as previously described, as well as several wire treatment functions including stripping, cutting, crimping and bending.

What is claimed is:

1. In combination:
   (i) a fish tape; and
   (ii) a pliers for holding and pulling the fish tape said pliers comprising:
   a first member and a second member, each said member comprises a distally disposed jaw and a proximately disposed handle;
   means for pivotably connecting the members so that the handles open and close the jaws, said means for pivotably connecting the members comprises a pivot axis, and said pliers comprises a center plane disposed through said pivot axis;
   said first member comprises a first wall, said first wall being planar, and said planar first wall and said center plane subtend a first angle;
   said second member comprises a second wall, said second wall being curvilinear;
   said first and second walls being spacedly facingly disposed so as to define a first channel with the jaws fully closed absent the fish tape;
   said jaws comprising facingly disposed fish tape grip surfaces, said jaws grip surfaces being spacedly disposed with the jaws fully closed absent the fish tape so as to define a second channel; said first and a second channels being sized for holding the fish tape;
   said second channel engages a first portion of the fish tape, and said first channel walls engage a second portion of the fish tape, whereby with the fish tape engaged in the respective first and second channels the fish tape is disposed away from the handles.

2. The combination of claim 1, said first member comprises a second wall, said first member second wall being planar, said first member second wall subtends a second angle with respect to the center plane.

3. The combination of claim 2, said angles being equal.

4. The combination of claim 1, at least one said jaw fish tape grip surface comprises a cross-ridged surface, and at least one said jaw fish tape grip surface comprises a flat planar surface.

5. The combination of claim 1, said fish tape comprises an elongate member having oppositely disposed elongate surfaces, a portion of the elongate member surfaces being engaged in the first channel.

6. In combination:
(i) a fish tape; and
(ii) a pliers for holding and pulling the fish tape said pliers comprising:
a first member and a second member, each said member comprises a distally disposed jaw and a proximately disposed handle;
means for pivotably connecting the members so that the handles open and close the jaws, said means for pivotably connecting the members comprises a pivot axis, and said pliers comprises a center plane disposed through said pivot axis;
said first member comprises a first wall, said first wall being planar, and said planar first wall and said center plane subtend a first angle;
said second member comprises a second wall, said second wall being curvilinear;
said first member first wail and said second member second wall being spacedly facingly disposed so as to define a first channel with the jaws fully closed absent the fish tape;
said jaws comprising facingly disposed fish tape grip surfaces, said jaws grip surfaces being spacedly disposed with the jaws fully closed absent the fish tape so as to define a second channel;
said first and second channels being sized for holding the fish tape;
said first member comprises a second wall, said first member second wall being planar, said first member second wall subtends a second angle with respect to the center plane;
said second channel engages a first portion of the fish tape, and said first channel engages a second portion of the fish tape;
whereby with the fish tape engaged in the respective channels the fish tape is directed to be disposed away from the handles.

7. The combination of claim 6, said angles being acute and equal.

8. The combination of claim 6, at least one said jaw fish tape grip surface comprises a cross-ridged surface, and at least one said jaw fish tape grip surface comprises a flat planar surface.

9. The combination of claim 6, said second channel is more distally disposed from said first channel.

10. The combination of claim 6, said planar walls being distally disposed from said pivot axis.

* * * * *